US007859141B2

(12) United States Patent
Sadarangani et al.

(10) Patent No.: US 7,859,141 B2
(45) Date of Patent: Dec. 28, 2010

(54) ELECTRICAL MACHINE AND USE THEREOF (75) Inventors: Chandur Sadarangani, Västerås (SE);
Thomas Bäckström, Västerås (SE);
Waqas M. Arshad, Västerås (SE)

(73) Assignee: Volvo Technology AB, Gothenburg (SE)

( * ) Notice: Subject to any disclaimer, the term of this patent is extended or adjusted under 35 U.S.C. 154(b) by 483 days.

(21) Appl. No.: 10/524,388

(22) PCT Filed: Aug. 13, 2003

(86) PCT No.: PCT/SE03/01270

§ 371 (c)(1),
(2), (4) Date: Sep. 7, 2005

(87) PCT Pub. No.: WO2004/017501

PCT Pub. Date: Feb. 26, 2004

(65) Prior Publication Data

US 2006/0131974 A1    Jun. 22, 2006

(30) Foreign Application Priority Data

Aug. 14, 2002  (SE)  .................................. 0202419

(51) Int. Cl.
*H02K 41/02* (2006.01)
(52) U.S. Cl. .............. 310/12.24; 310/12.25; 310/12.26; 310/156.53; 310/156.56; 310/156.43
(58) Field of Classification Search ............ 310/156.43, 310/156.53, 156.56, 156.32–156.37, 156.84, 310/156.38, 156.07, 12, 156.01, 12.24–12.26
See application file for complete search history.

(56) References Cited

U.S. PATENT DOCUMENTS 3,334,254 A * 8/1967 Kober .................... 310/156.07

(Continued)

FOREIGN PATENT DOCUMENTS

JP         04251535 A  *  9/1992

(Continued)

OTHER PUBLICATIONS

International Search Report for International Application No. PCT/SE2003/001270 completed Oct. 30, 2003.

(Continued)

*Primary Examiner*—Quyen Leung
*Assistant Examiner*—Alex W Mok
(74) *Attorney, Agent, or Firm*—Alston & Bird LLP (57) ABSTRACT The invention relates to an electrical machine of the transversal-flux type. The machine comprises a stator and a movable element. The stator has a plurality of stator elements with magnetic flux conductors and an electric winding extending in a closed winding path through each magnetic flux conductor. The movable element comprises a number of permanent-magnet members and is movable in relation to the stator along a movement path. The winding path comprises a first current-carrying section extending along the movement path. Each magnetic flux conductor forms, together with one of the permanent-magnet members, a closed magnetic flux circuit around said current-carrying section. Each permanent-magnet member comprises a primary magnet with a magnetic direction across the movement path. Adjacently located permanent-magnet members are separated from each other by an intermediate member comprising at least one secondary magnet that has a magnetic direction essentially across the magnetic direction of the primary magnet.

27 Claims, 7 Drawing Sheets

U.S. PATENT DOCUMENTS

| | | | |
|---|---|---|---|
| 4,308,479 A * | 12/1981 | Richter | 310/156.07 |
| 4,893,040 A * | 1/1990 | Turner et al. | 310/156.25 |
| 5,051,641 A | 9/1991 | Weh | |
| 5,117,142 A | 5/1992 | Von Zweygbergk | |
| 5,434,458 A * | 7/1995 | Stuart et al. | 310/13 |
| 5,723,917 A * | 3/1998 | Chitayat | 310/12 |
| 5,808,392 A * | 9/1998 | Sakai et al. | 310/214 |
| 5,854,521 A * | 12/1998 | Nolle | 310/12 |
| 6,043,572 A * | 3/2000 | Nagai et al. | 310/12.25 |
| 6,043,579 A * | 3/2000 | Hill | 310/164 |
| 6,104,108 A * | 8/2000 | Hazelton et al. | 310/12 |
| 6,211,593 B1 * | 4/2001 | Nashiki | 310/156.33 |
| 6,229,238 B1 | 5/2001 | Graef | |
| 6,313,551 B1 * | 11/2001 | Hazelton | 310/12.24 |
| 6,326,706 B1 * | 12/2001 | Zhang | 310/12 |
| 6,417,914 B1 * | 7/2002 | Li | 310/12.06 |
| 2002/0043879 A1 * | 4/2002 | Joong et al. | 310/12 |
| 2002/0050743 A1 * | 5/2002 | Okada et al. | 310/12 |
| 2002/0070612 A1 * | 6/2002 | Joong et al. | 310/12 |
| 2002/0180295 A1 * | 12/2002 | Kaneda et al. | 310/156.43 |
| 2003/0006871 A1 * | 1/2003 | Post | 335/306 |
| 2003/0052548 A1 * | 3/2003 | Hol et al. | 310/12 |
| 2003/0127917 A1 * | 7/2003 | Kang et al. | 310/12 |

FOREIGN PATENT DOCUMENTS

| | | |
|---|---|---|
| JP | 11308793 | 11/1999 |
| JP | 2000197287 | 7/2000 |
| JP | 2001028873 | 1/2001 |
| JP | 2001258235 | 9/2001 |
| JP | 2002136098 | 5/2002 |
| WO | WO 01/78218 | 10/2001 |
| WO | WO 01/78219 | 10/2001 |
| WO | WO 0178218 | 10/2001 |

OTHER PUBLICATIONS

Translation of Official Action dated Oct. 9, 2009, Japanese Patent Application No. JP2004-528995.

Translation of Official Action dated Jul. 30, 2010, Japanese Patent Application No. JP2004-528995.

* cited by examiner

ELECTRICAL MACHINE AND USE THEREOF

TECHNICAL FIELD AND BACKGROUND ART

The present invention relates to an electrical machine of the transversal-flux type according to the preamble to claim 1 (see WO01/78218 (ABB AB) and WO01/78219 (ABB AB)). The invention also relates to a use of such an electrical machine.

Conventional electrical machines operate according to the so-called longitudinal-flux principle, which means that the magnetic flux plane of each stator element is parallel to the direction of movement of the rotor. U.S. Pat. No. 5,177,142 (Von Zweygbergk) discloses an electrical machine that operates according to the so-called transversal-flux principle. This known machine comprises a rotating rotor with a number of permanent magnets and a stator with a corresponding number of stator elements that are arranged in such a way that the induced magnetic flux substantially follows a path perpendicular to the direction of rotation of the rotor. The known machine is characterized by a high power or torque density, that is, a large power or a large torque in relation to the volume or physical size of the machine is obtained. U.S. Pat. No. 5,177,142 discloses rotating machines of the transversal-flux type.

WO01/78218 and WO01/78219 both disclose a linear electrical machine of the transversal-flux type. The known machine comprises a stator with a plurality of magnetic flux conductors and an electric conductor that forms a winding extending in a closed winding path through each magnetic flux conductor. The machine also comprises a movable element with a number of permanent-magnet elements. The movable element describes a reciprocating motion in relation to the stator along a movement path in a space with a finite length. The closed winding path comprises a first current-carrying section extending essentially parallel to the movement path. Each magnetic flux conductor together with one of the permanent-magnet elements forms a closed magnetic flux circuit extending around the current-carrying section. The magnetic flux conductors are arranged in an alternating order with respect to the direction of the magnetic flux in relation to the permanent-magnet elements and the magnetic flux circuit, respectively.

As mentioned above, transversal-flux machines are characterized by a high power or torque density, that is, the power or torque that may be obtained is great in relation to the physical size of the machine. Further, the power in a transversal machine, contrary to that of a conventional electrical machine, is directly proportional to the number of poles of the stator and the rotor or the movable element. As shown in the above-mentioned WO01/78218 and WO01/78219, a transversal machine may be made very compact, that is, with a large number of poles in a relatively small machine. However, the high torque density of known transversal-flux machines is associated with a relatively low power factor, that is, both the machine and the control unit must be designed for relatively great dimensional outputs compared with their active rated powers. The reason for the low power factor is that known transversal-flux machines have a relatively great leakage of the magnetic flux, which results in a weak magnetic coupling between the stator and the movable element or rotor. The magnetic leakage, which is of a certain magnitude in all types of electrical machines, means that part of the magnetic flux disappears from the imaginary magnetic flux circuit without performing any work. The leakage thus deteriorates the efficiency of the machine.

In the above-mentioned electrical machines of transversal-flux type, leakage may arise both in the stator and in the movable element or the rotor. In the stator, leakage may arise between adjacent magnetic flux conductors in those sections where the magnetic flux extends in opposite directions in the adjacent magnetic flux conductors. In the rotor, leakage may arise between adjacent permanent magnets since these have a magnetic flux in opposite directions.

SUMMARY OF THE INVENTION

The object of the present invention is to provide an electrical machine of the transversal-flux type with a high torque density and with improved power factor, that is, with a small magnetic leakage.

This object is achieved with the electrical machine described in the introductory part of the description, which is characterized in that adjacent permanent-magnet members of the movable element are separated from one another by an intermediate member that comprises at least one secondary magnetic which has a north pole and a south pole and a magnetic direction that extends from the south pole to the north pole and essentially across the magnetic direction of the primary magnet.

With such a secondary magnet, the magnetic flux leakage in the movable element between adjacent permanent magnets may be reduced by compensating the secondary magnet for the leakage. The secondary magnet creates an addition of magnetic flux from the rotor to the stator in a magnetic flux circuit and from the stator to the rotor in an adjacent magnetic flux circuit. More exactly, the magnetic direction of the secondary magnet may advantageously extend essentially parallel to the movement path. The movement path may be a straight or somewhat curved line, along which the movable element moves, for example in a reciprocating motion. The movement path may also consist of a circle, whereby the movable element rotates around a centre point.

According to another embodiment of the invention, each intermediate member of the movable element comprises two secondary magnets. The secondary magnets of an intermediate member between the first and second adjacent permanent-magnet members may then advantageously be arranged in such a way that the first secondary magnet is in the vicinity of the north pole of the primary magnet of the first permanent-magnet member and the south pole of the primary magnet of the second permanent-magnet member and so that the second secondary magnet is in the vicinity of the south pole of the primary magnet of the first permanent-magnet member and the north pole of the primary magnet of the second permanent-magnet member. In this way, the magnetic flux at each permanent-magnet member will be concentrated at the two poles in a direction to or from the magnetic flux conductors of the stator.

According to a further embodiment of the invention, each intermediate member of the movable element comprises a layer of a magnetically insulating material outside of the two secondary magnets. Such a layer may, for example, be formed from non-magnetic material, such as stainless steel, and contributes to prevent demagnetization of the secondary magnets by so-called armature reaction.

According to still another embodiment of the invention, each permanent-magnet member comprises a first magnetic flux conductor on one side of the primary magnet and a second magnetic flux conductor on the other side of the primary magnet. Further, the secondary magnets of an intermediate member between two adjacent permanent-magnet members may advantageously be arranged in such a way that the first secondary magnet extends between said first magnetic flux conductor of the two permanent-magnet members and so that the second secondary magnet extends between said second magnetic flux conductor of the two permanent-magnet members. With such a design, the north poles of two secondary magnets and one primary magnet may all be directed towards, for example, the first magnetic flux conductor and the south poles of two secondary magnets and one primary magnet all be directed towards, for example, the second magnetic flux conductor. In this way, the total pole area towards the magnetic flux conductors will be large and the magnetic flux conductors will concentrate the magnetic flux in a direction to or from the stator.

According to yet another embodiment of the invention, the magnetic direction of said secondary magnet is essentially perpendicular in relation to the magnetic direction of the primary magnets. Further, each magnetic flux circuit may comprise a magnetic flux that is parallel to a plane which is essentially perpendicular to the movement path. The distance between a centre of adjacent permanent-magnet members is advantageously equal to the distance between a centre of adjacent magnetic flux conductors in the stator. Further, the magnetic flux conductors of the stator may then be arranged in an alternating order with respect to the direction of the magnetic flux in relation to the permanent-magnet members in the respective magnetic flux circuit.

According to a still further embodiment of the invention, the essentially closed winding path comprises a second current-carrying section extending essentially parallel to the movement path. In this way, a very large part of the essentially closed winding path may be utilized for generation of current and hence the losses are kept at a very low level. Further, the first current-carrying section of the winding path may be associated with essentially a first half of said magnetic flux conductors and the second current-carrying section of the winding path be associated with an essentially second half of said magnetic flux conductors. Preferably, the permanent-magnet members of the movable element are adapted to cooperate with those magnetic flux conductors of the stator which are associated with the first current-carrying section, and those magnetic flux conductors of the stator which are associated with the second current-carrying section.

According to an additional embodiment of the invention, each magnetic flux conductor comprises at least one magnetic flux-conducting section, wherein said sections of each magnetic flux conductor are arranged in a line one after the other which is parallel to the movement path, wherein the magnetic flux of said sections of each magnetic flux conductor extends essentially in the same direction and wherein a dividing member is arranged between each pair of adjacent magnetic flux conductors and comprises main sections that include a magnetically conducting material and extend along said sections. In such a magnetic flux-conducting dividing member and adjacent sections of the magnetic flux conductors, the magnetic flux will extend in the same direction, which means that the magnetic leakage between the magnetic flux conductors may be reduced considerably. So-called flux fringing in the stator may thus be essentially prevented. Said sections advantageously form a magnetic flux-conducting central section. Further, each magnetic flux conductor may comprise at least said central section and two magnetic flux-conducting end sections adjoining an air gap between the stator and the movable element. Each dividing member is preferably magnetically insulating along the end sections, which prevent magnetic leakage caused by the opposite magnetic flux direction of adjacent permanent-magnet members of the movable element. The magnetic insulation may advantageously be achieved in such a way that each dividing member forms a space with air along the end sections. The main section of said dividing member may be made of magnetically conducting iron.

According to another embodiment of the invention, the two end sections of each magnetic flux conductor are displaced in a plane essentially perpendicular to the movement path in relation to the end sections of each adjacent magnetic flux conductor.

According to still another embodiment of the invention, the movable element is adapted to carry out a reciprocating motion. Further, the movable element may be connected to at least one piston that is movably arranged in a housing. In this case, the electrical machine may be arranged to cooperate with a combustion engine, wherein said housing forms a combustion chamber in which the piston is movable back and forth. The electrical machine may thus be utilized as an electric generator, whereby the movement of the piston is substantially achieved with the aid of a combustion process in a manner known per se. In accordance with the principles described in WO01/45977, however, electrical energy may be fed to the stator of the machine to bring about an exact positioning of the piston in the housing when the combustion is initiated. Thus, the electrical machine may serve, besides for generating electric power, as a connecting rod for the piston. The electrical machine may also be utilized as a pure electric motor, for example for driving a piston pump.

According to yet another embodiment of the invention, the movable element is adapted to carry out a rotating movement. Such a rotating electrical machine may serve and be utilized as a motor for driving a vehicle or some other device. The high power or torque density makes the electrical machine suitable, for example, as a wheel motor in a vehicle, that is, a motor that is arranged in close proximity to a vehicle wheel.

According to a further embodiment of the invention, the electrical machine is intended to operate as a generator for generating electric power. Because of the high torque density, the machine may be driven relatively slowly, which is an advantage in many applications, for example as an electric generator in a wind power plant for a rotating electrical machine or as an electric generator in a wave power plant for a linear electrical machine.

BRIEF DESCRIPTION OF THE DRAWINGS

The present invention will now be explained in greater detail by means of various embodiments, which are shown as examples only, and with reference to the accompanying drawings, wherein FIG. 1 schematically shows a view of a linear electrical machine according to a first embodiment of the invention.

DETAILED DESCRIPTION OF DIFFERENT EMBODIMENTS OF THE INVENTION

Figure 1:
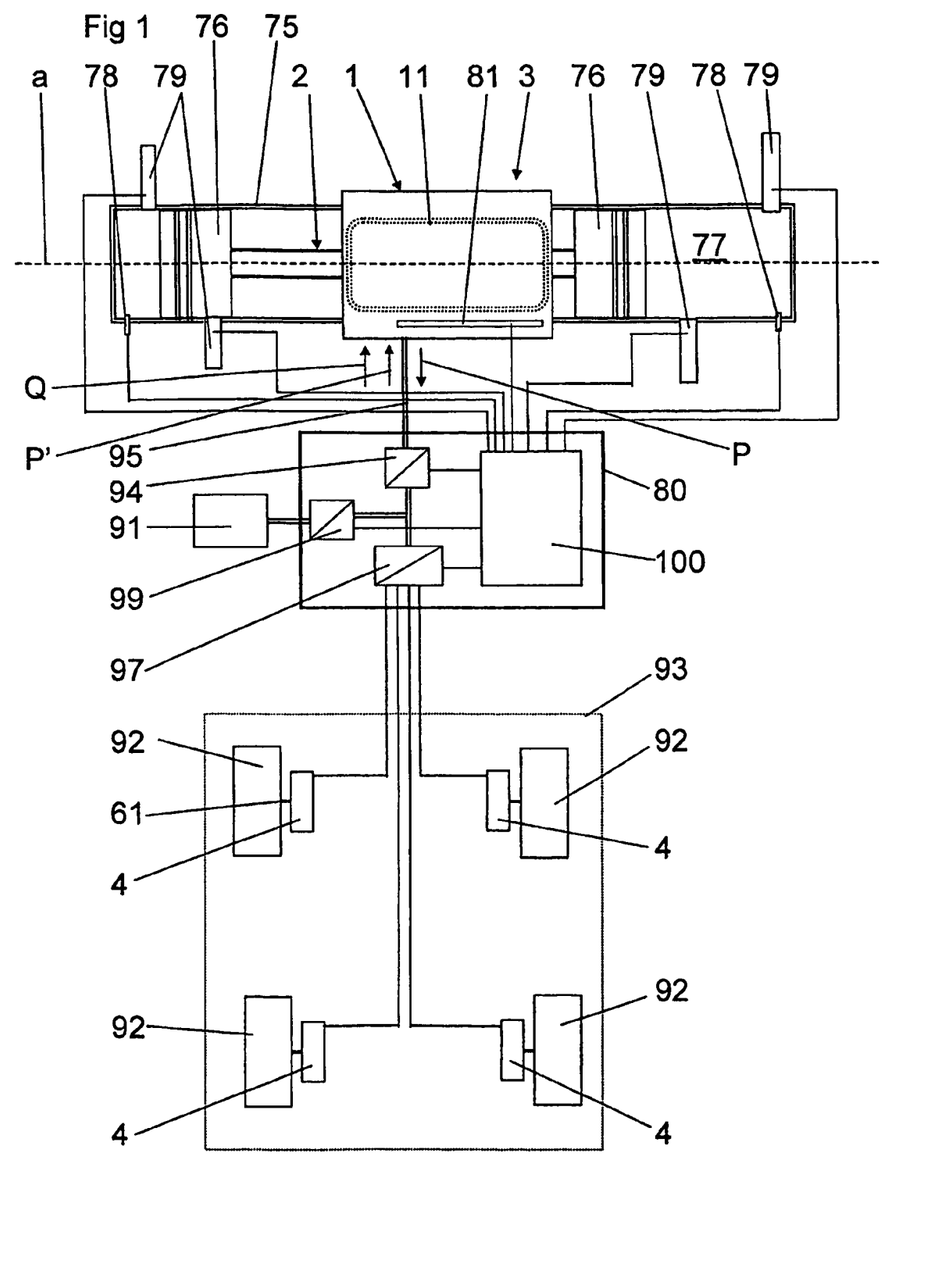

The present invention relates to an electrical machine of the transversal-flux type. The electrical machine comprises a stator 1 and a movable element 2. FIG. 1 schematically shows a linear electrical machine 3 according to a first embodiment of the invention with a movable element 2 moving in relation to the stator 1 back and forth along an essentially rectilinear movement path extending parallel to the axis a. It should be noted that in this application, the expression linear electrical machine also relates to the case where the movable element 2 moves back and forth along an arched movement path.

Figure 8:
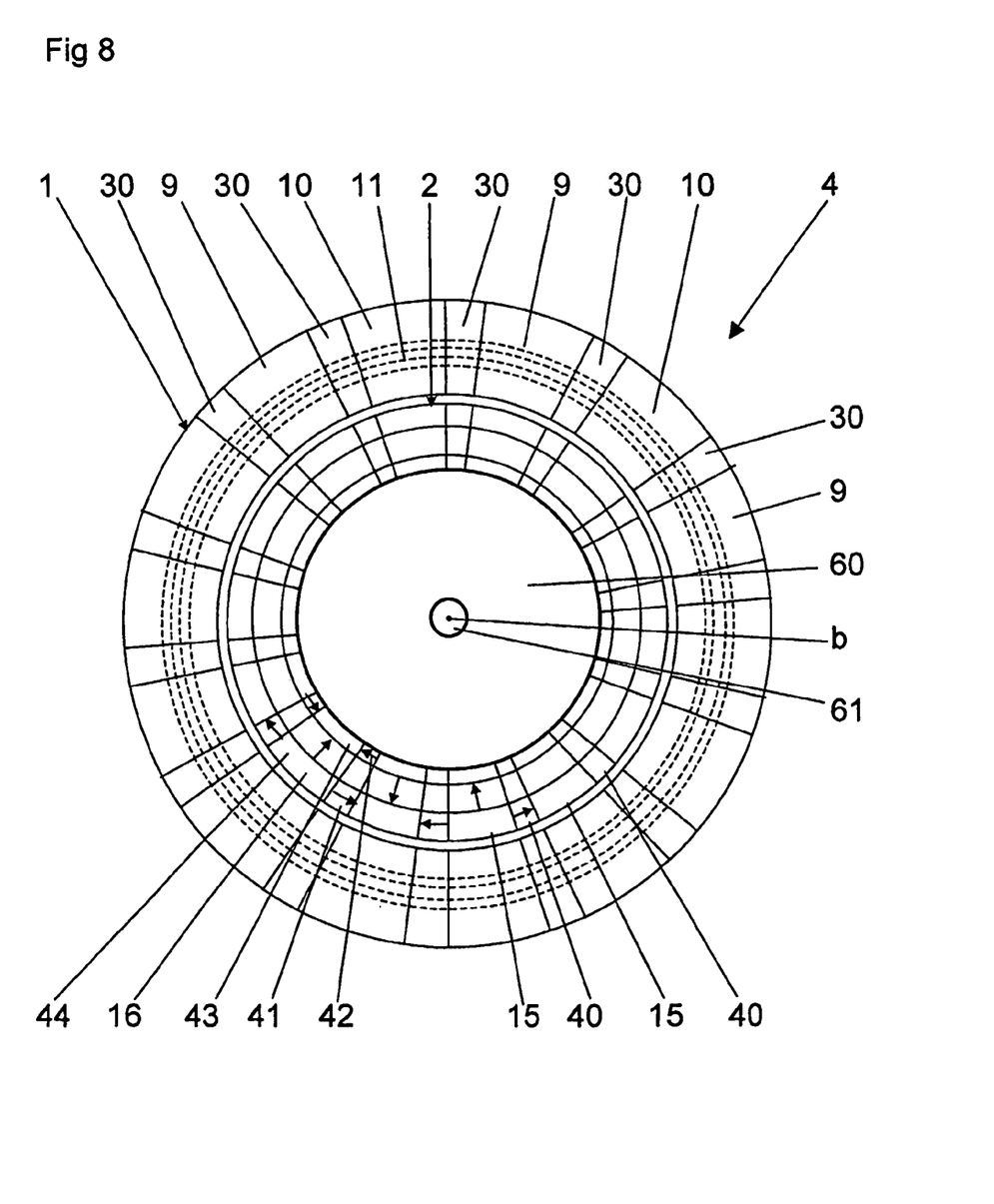
FIG. 8 schematically shows a view of a rotating electrical machine according to a second embodiment of the invention.

FIG. 8 schematically shows a rotating electrical machine 4 according to a second embodiment of the invention with a movable element 2 in the form of a rotor rotating around a centre axis b, the movement path extending along a circle around the centre axis b. In this case, as in the arched case above, the term movement path, in the expressions "across the movement path" and "parallel to the movement path", respectively, means the tangent to the movement path in the position in question.

In the following, the first embodiment will first be described with reference to FIGS. 1-7, wherein FIG. 2 only shows a schematic composition whereas FIGS. 3-7 show more of a possible design. The stator 1 comprises a plurality of stator elements 9, 10 (see FIG. 2) and an electric conductor that forms a winding 11 extending in an essentially closed winding path, which is schematically indicated in FIG. 1. The winding 11 extends through each stator element 9, 10. In the embodiment shown in FIGS. 2-7, the essentially closed winding path comprises a first essentially rectilinear current-carrying section 12 extending essentially parallel to the movement path and the axis a, and a second essentially rectilinear current-carrying section 13 extending essentially along the movement path and the axis a (see especially FIGS. 3 and 4). The two essentially rectilinear sections 12 and 13 are connected to each other at the ends, as indicated in FIG. 1, the winding 11 thus being closed.

The movable element 2 comprises a number of permanent-magnet members 15 (see FIGS. 2, 3, 4 and 6), each of which comprising a primary magnet 16. Each primary magnet 16 has a north pole and a south pole and a magnetic direction extending from the south pole to the north pole. Thus, the magnetic direction of the primary magnets 16 extends essentially across the movement path and the axis a, and more precisely essentially perpendicular to the movement path and the axis a. As will be clear from FIG. 2, the permanent-magnet members 15 are arranged in an alternating order in the movable element 2 with respect to the magnetic direction of the permanent-magnet members 15. Each permanent-magnet member 15 has essentially the same width. Further, the distance between a centre of adjacent permanent-magnet members 15 is essentially equal to the distance between a centre of adjacent stator elements 9, 10 of the stator 1.

Figure 3:
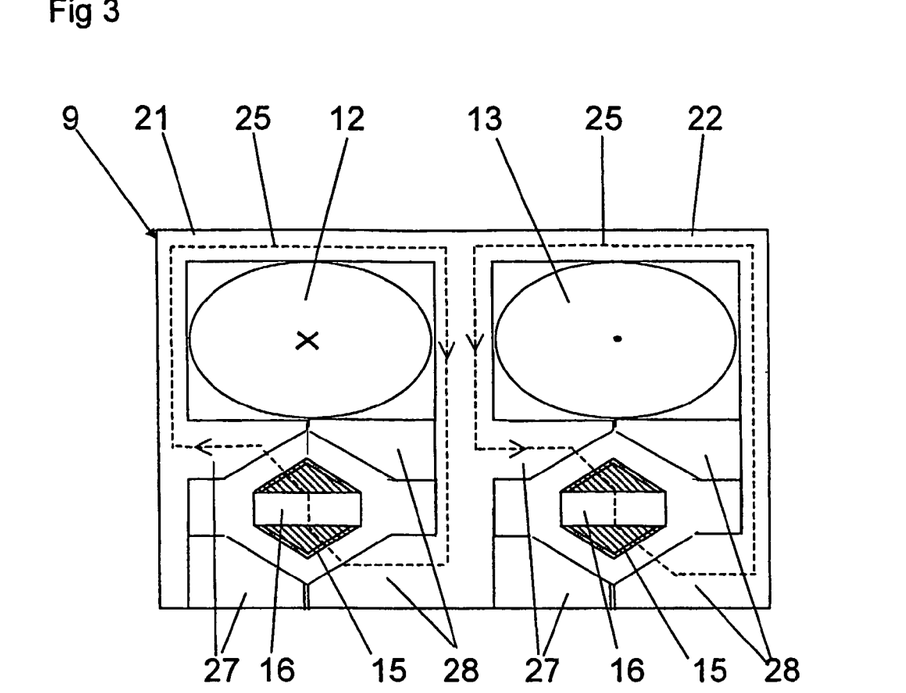
FIG. 3 shows a cross-section view of a first stator element of a linear electrical machine according to the first embodiment.
Figure 4:
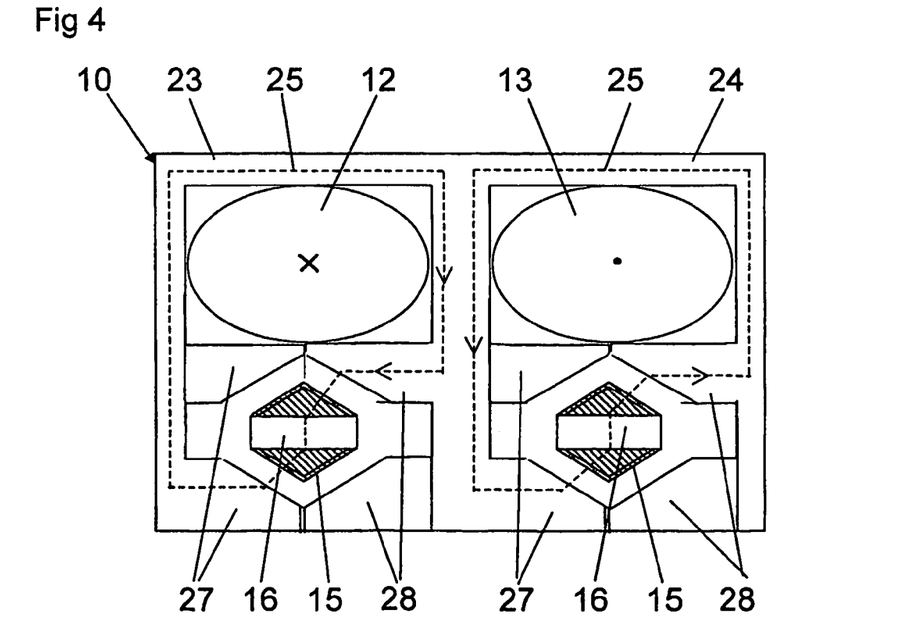
FIG. 4 shows a cross-section view through a second adjacent stator element of a linear electrical machine according to the first embodiment.

In the embodiment shown in FIGS. 3 and 4, each stator element 9, 10 comprises two magnetic flux conductors 21, 22 and 23, 24, respectively. Each magnetic flux conductor 21, 22 and 23, 24, respectively, forms together with one of the permanent-magnet members 15 a closed magnetic flux circuit 25, extending around a respective current-carrying section 12, 13 of the winding 11 which is indicated by a dashed line in FIGS. 3 and 4. Each magnetic flux conductor 25 thus comprises a magnetic flux that is parallel to a plane which is essentially perpendicular to the movement path and the axis a.

Figure 5:
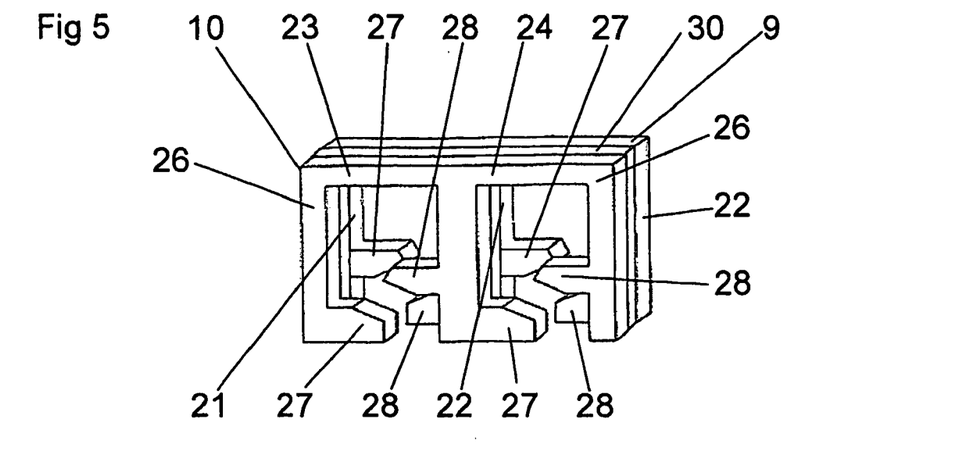
FIG. 5 shows a perspective view of a stator element and a dividing member of a stator of an electrical machine according to the first embodiment.

The electrical machine thus comprises two types of stator elements 9, 10. FIG. 3 shows a first type of stator element 9 at the very front of the figure with the two magnetic flux conductors 21 and 22. FIG. 4 shows a second type of stator element 10 at the very front of the figure with the two magnetic flux conductors 23 and 24. FIG. 5 shows the two types of stator elements 9 and 10 arranged one after the other with a dividing member 30 therebetween. The dividing member 30 will be explained in greater detail below.

The first current-carrying section 12 is associated with essentially a first half of the magnetic flux conductors, that is, the magnetic flux conductors 21 and 23, whereas the second current-carrying section 13 is associated with essentially a second half of the magnetic flux conductors, that is, the magnetic flux conductors 22 and 24. In the embodiment shown in FIGS. 1-7, the electrical machine comprises two movable elements 2 with permanent-magnet members 15. The first movable element 2 cooperates with the magnetic flux conductors 21 and 23 and the second movable element cooperates with the magnetic flux conductors 22 and 24. The magnetic flux conductors 21, 22 and 23, 24, respectively, are arranged in an alternating sequence with respect to the direction of the magnetic flux in relation to the permanent-magnet members in the respective magnetic flux circuit.

It should be noted here that the invention is not limited to such an embodiment with two movable elements 2 but it may also be realized with only one movable element 2, in which case two magnetic flux conductors extend around a respective current-carrying section and through the same permanent-magnet members. Such a principle is shown in WO01/78218 (ABB AB) and may very well be applied also to this invention.

Figure 2:
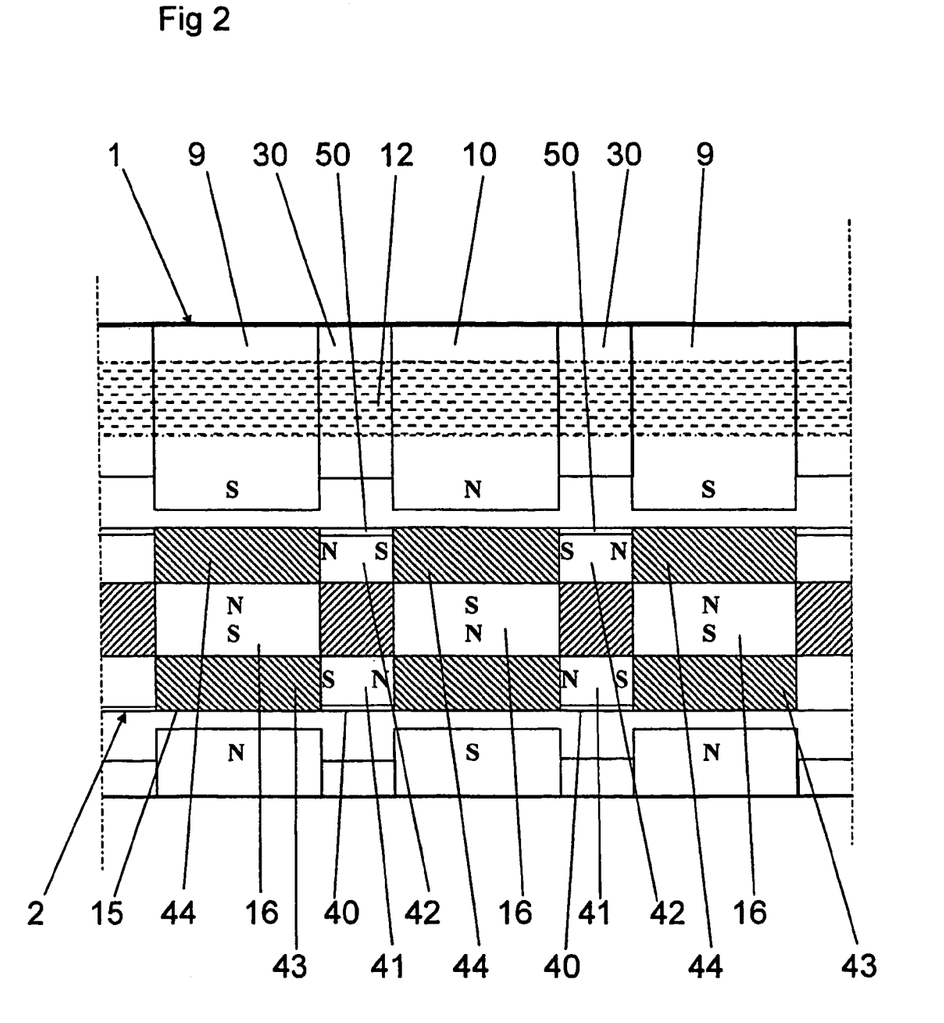
FIG. 2 schematically shows a longitudinal section view of part of a linear electrical machine according to the first embodiment.
Figure 7:
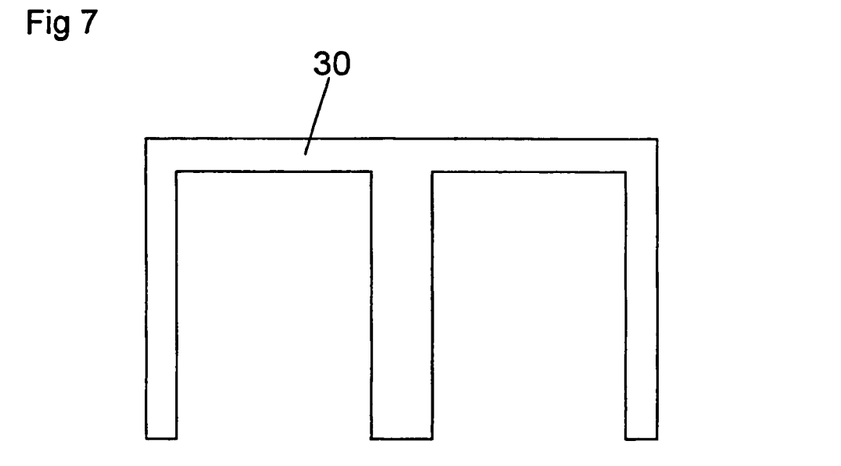
FIG. 7 shows a view of the dividing member of FIG. 5.

The stator 1 further comprises the above-mentioned dividing members 30 (see FIGS. 2, 5 and 7). Such a dividing member 30 is arranged between essentially each pair of stator elements 9, 10 with magnetic flux conductors 21-24. Each magnetic flux conductor 21-24 comprises at least one magnetic flux-conducting central section 26, said sections being located in a line one after the other. This line is parallel to the movement path and to the axis a. The magnetic flux of these magnetic flux-conducting central sections 26 of each magnetic flux conductor 21-24 extends in essentially the same direction, which is clear from FIGS. 3 and 4. Each dividing member 30 comprises main sections, which in the embodiment shown extend along the entire dividing member 30 and which comprise a magnetically conducting material, for example magnetically conducting iron. The dividing member 30 and the magnetic material will thus extend along the magnetic flux-conducting central section 26 of the magnetic flux conductors 21-24.

Further, each magnetic flux conductor 21-24 comprises two magnetic flux-conducting end sections 27 and 28, which extend inwardly from the central section 26 towards the permanent-magnet member 15. The intermediate dividing members 30 are magnetically insulating along the end sections 27 and 28. This can be achieved by each dividing member 30 forming a void or a space with air along the end sections 27 and 28; cf. especially FIGS. 3-5, where the two end sections 27 and 28 of the magnetic flux conductors 21 and 22 are displaced in a plane essentially perpendicular to the movement path and the axis a in relation to the end sections 27 and 28 of the adjacent magnetic flux conductors 23 and 24. The space between the end sections 27 and 28 may also be filled with a magnetically insulating material. The magnetic flux in the central sections 26 of all the magnetic flux conductors 21 and 23 lying one after the other and in the main sections of all the dividing members 30 arranged therebetween will thus extend in the same direction. Likewise, the magnetic flux in the central sections 26 of all the magnetic flux conductors 22 and 24 lying one after the other and in the main sections of all the dividing members 30 arranged therebetween will extend in the same direction. In this way, the magnetic leakage between the magnetic flux conductors 21 and 23 and between the magnetic flux conductors 22 and 24, respectively, will be reduced considerably. So-called flux fringing in the stator 1 may therefore be essentially avoided.

The movable elements 2 will now be described in greater detail. Essentially each pair of adjacent permanent-magnet members 15 of each one of the movable elements 2 is separated by an intermediate member 40. Essentially each such intermediate member 40 comprises, in the embodiment shown, two secondary magnets 41 and 42, each of which has a north pole and a south pole and a magnetic direction extending from the south pole to the north pole. The magnetic direction of essentially each secondary magnet 41, 42 extends essentially across the magnetic direction of the primary magnet 16, and in the embodiment shown perpendicular to the magnetic direction of the primary magnet 16. Thus, the magnetic direction of the secondary magnet extends essentially parallel to the movement path of the axis a.

Figure 6:
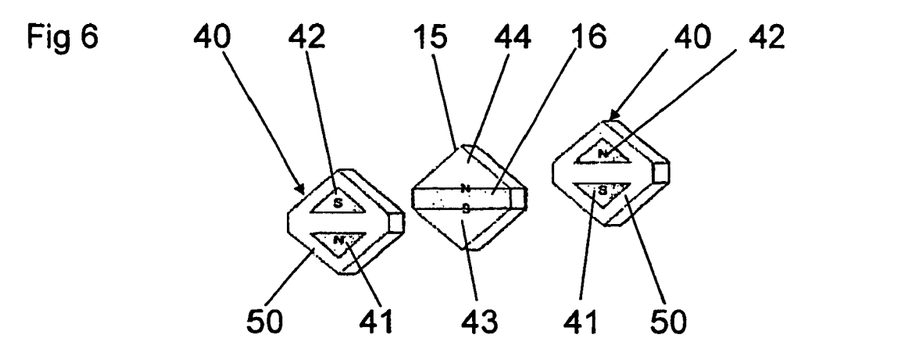
FIG. 6 shows an exploded view of a permanent-magnet member and two intermediate members of a movable element of an electrical machine according to the first embodiment.

As is clear from FIGS. 2 and 6, the secondary magnets 41 and 42 of an intermediate member 40 between two adjacent permanent-magnet members 15 are arranged in such a way that the first secondary magnet 41 is in the vicinity of the north pole of the primary magnet 16 of one permanent-magnet member 15 and the south pole of the primary magnet 16 of the other permanent-magnet member 15 and such that the second secondary magnet 42 is in the vicinity of the south pole of the primary magnet 16 of one permanent-magnet member 15 and the north pole of the primary magnet 16 of the other permanent-magnet member 15.

In the embodiment shown, in addition, each permanent-magnet member 15 comprises a first magnetic flux conductor 43 on one side of the primary magnet 16 and a second magnetic flux conductor 44 on the other side of the primary magnet 16. In this way, the secondary magnet 41 of an intermediate member 40 between two adjacent permanent-magnet members 15 will extend between the first magnetic flux conductors 43 and the second secondary magnet 42 between the second magnetic flux conductors 44. It should be noted here that the magnetic flux conductors 43 and 44 are not necessary. The primary magnets 15 may, in this case, extend across the whole movable element 2, that is, each primary-magnet member 16 consists solely, or essentially solely, of a primary magnet 15.

Further, each intermediate member 40 of the movable element 2 comprises a layer 50 of a magnetically insulating material, which extends around and encloses the two secondary magnets 41, 42, see especially FIG. 6, in the intermediate member 40.

Figure 9:
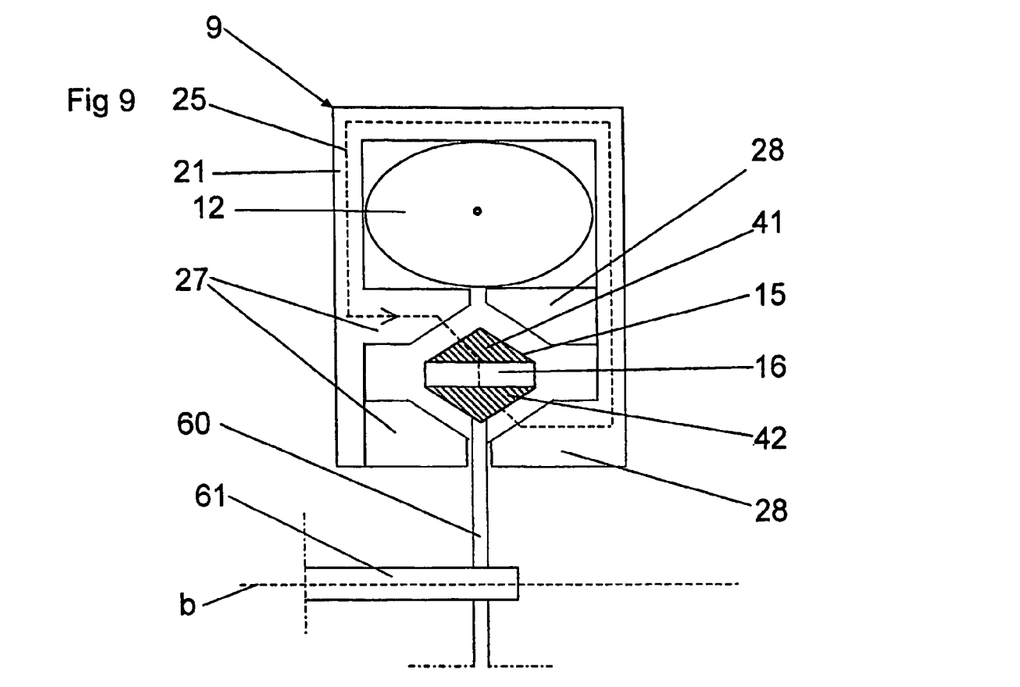
FIG. 9 schematically shows a radial section through a first stator element of a rotating electrical machine according to the second embodiment.
Figure 10:
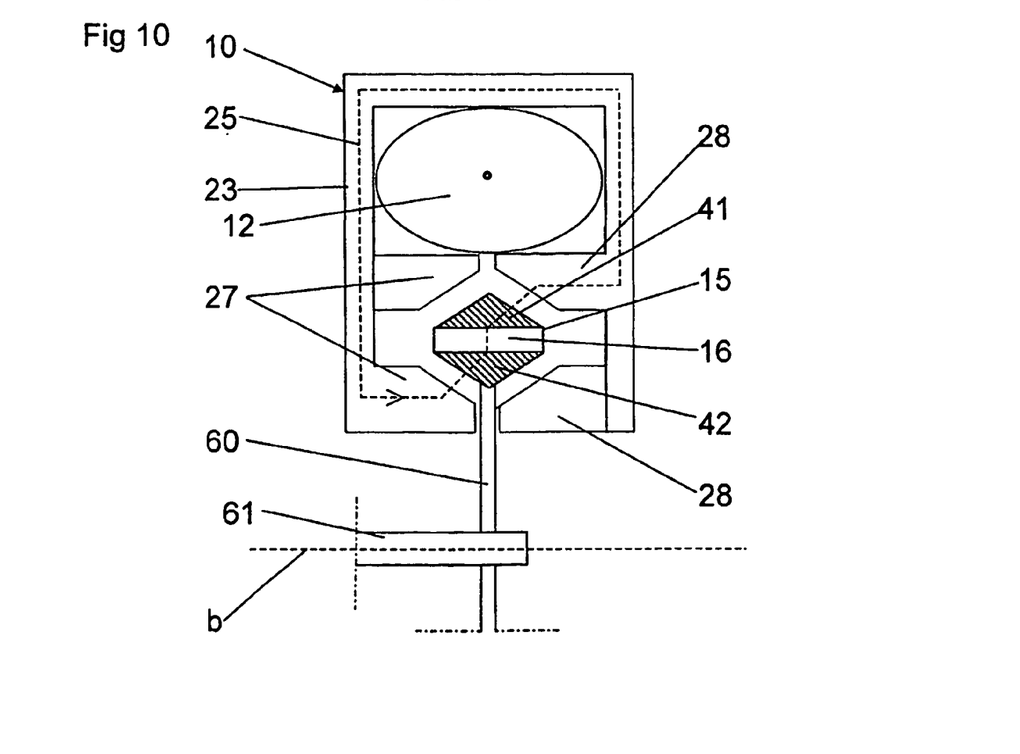
FIG. 10 schematically shows a radial section through a second stator element of a rotating electrical machine according to the second embodiment.

FIGS. 8 to 10 show a second embodiment of a rotating electrical machine 4. This electrical machine 4 functions in the same way as the electrical machine 3 in the first embodiment and elements with a corresponding or the same function have been given the same reference numerals in the two embodiments. Winding 11 in this embodiment comprises only one current-carrying section 12 extending around the rotor 2 and through each stator element 9, 10. Each stator element 9, 10 comprises a magnetic flux conductor 21, 23 for a magnetic flux extending in parallel with an essentially radial plane with respect to axis b. Also the rotating electrical machine 4 comprises two types of stator elements 9 and 10, which is clear from FIGS. 9 and 10. The magnetic flux conductors 21 and 23 form together with a respective permanent-magnet member 15 a magnetic flux circuit 25 extending in parallel with a radial plane. In principle, the permanent-magnet members 15 have the same composition as in the linear machine 3 but are arranged along a circular movement path that is parallel to a peripheral line of the robot 2. The rotor 2 comprises a support member 60 supporting the peripheral permanent-magnet members 15. The support member 60 is connected to a shaft 61 that rotates around an axis of rotation b and that is adapted to transmit mechanical force to or from the rotor 2 and from or to an external device, for example one or more drive wheels 92 of a vehicle (see FIG. 1).

FIG. 1 shows how the electrical machine 3 is able to cooperate with a combustion engine comprising a housing 75 and two pistons 76 which are mechanically freely movable in the housing 75. The pistons 76 are connected to the movable element 2 and may thus move in a rectilinear reciprocating motion in the housing 75 in parallel with the above-mentioned movement path and with the axis a. The pistons 76 are not mechanically connected to any element for transmission of force, for example via a connecting rod and a crankshaft. In the embodiment shown, two pistons 76 are arranged. It is, however, possible to arrange only one piston 76 and, for example, replace the second piston by a spring element that attends to the reciprocating motion of the movable element 2. The combustion engine may operate according to principles of combustion engines known per se. For example, the combustion engine 1 may be a two-stroke or a four-stroke Otto engine or diesel engine. The combustion engine may also comprise a so-called HCCI (Homogeneous Charge Compression Ignition) engine which may be regarded as a mixture between an Otto engine and a diesel engine, whereby a mixture of oxidizer and fuel is injected into the combustion chamber and ignited at high compression by self-ignition. In addition to combustion engines with internal combustion, that is, in the housing 75, the combustion engine may also comprise external combustion, for example a Stirling engine. An embodiment relating to an Otto engine, but which is also applicable to a considerable extent to other types of motors, will be described in the following. The housing 75 comprises an internal space which in the example shown forms two combustion chambers 77. For ignition and initiation of an intermittent combustion in the respective combustion chamber 77, a spark plug 78 may, for example, be arranged. Further, each combustion chamber 77 may, where appropriate, comprise valve means 79 or similar means enabling supply of fuel and oxidizer as well as removal of combustion gases. The mode of operation of the valve means 79 during operation of the combustion engine is controlled with the aid of a control unit 80 which is also adapted to initiate the supply of voltage pulses to the spark plugs 78 when combustion is to be initiated. The device also comprises schematically shown sensing members 81 for sensing the position of the pistons 76 in the housing 77. The sensing members 81 are connected to the control unit 80.

The control unit 80 is adapted, during operation of the device, to control the direction of the power exchanged between the winding 11 of the stator 1 and an external electric circuit. The external circuit may comprise an energy-storing member in the form of, for example, a battery 91, a current consumer in the form of one or more drive motors 4 for driving wheels 92 of a vehicle 93. The power exchange, which varies with the time and the movement of the movable element 2, is illustrated in FIG. 1 by the arrows P and P'. As will be clear, the combustion engine will generate an active power P, the mean value of which, in accordance with the object of the combustion engine, is considerably greater than the active power P' that is fed back with the aid of the winding 11 of the stator 1 to influence and position the pistons 76. The control unit 80 is thus adapted to control the magnitude of the power P, P' in the two directions in a continuous manner. It should also be noted that the control unit 80 is dimensioned and adapted for feeding reactive power to the winding 11 of the stator 1, which is illustrated by the arrow Q. In this way, the peak power may be increased by the reactive power Q to a greater or smaller extent achieving the magnetic flux in the winding 11. One advantage of the technique according to the invention is that the need of reactive power Q from the control unit 80 is smaller than with the prior art method, that is, the control unit 80 may be made smaller. The control unit 80 comprises a first converter 94 which is connected, with a first connection side, to the winding 11 of the stator 1 via the connection line 95 and which is connected, with a second connection side, to a first connection side of a second converter 97 via an electrical connection. The second converter 97 is connected, with its second connection side, to the external circuit, here represented by the drive motors 4 via the connection lines. The first converter 94 may, for example, be an AC/DC converter and the second converter 97 a DC/AC converter. The invention is not limited to these types of converters but these may be of all types available, that is, AC/DC, DC/AC, DC/DC or AC/AC. With the aid of the converters 94 and 97, the supply of the active power and of the reactive power is made possible.

Further, the control unit 80 comprises a third converter 99 which is connected, with a first connection side, to the second connection side of the first converter 94, and which is connected, with a second connection side, to the external circuit, here represented by the energy-storing member 91. In the example shown, the third converter 99 is a DC/DC converter. Also in this case, of course, other types of converters may be used. The converters 94, 97 and 99 comprise power electronics, preferably with diodes and IGBT valves. It should also be noted that two or three of the converters 94, 97 and 99 may constitute an integrated converter unit.

In addition, the control unit 80 comprises a computer 100, with one or more microprocessors, at least one memory unit and suitable members for communication. The computer 100 is adapted to control the converters 94, 97 and 99 for exchange of the active power and the supply of the reactive power to the winding 11 of the stator 1. Further, in the example shown, the computer 100 is connected to the spark plugs 78 and the valve members 79. The computer 100 receives signals from a large number of different sensors and sensing members of the combustion engine 1 and the vehicle. In the example shown, this is illustrated by the position-sensing member 81 only. With the aid of signals from the various sensing members and with the aid of software, the combustion engine and its mode of operation are illustrated in the computer 100. This software may be stored in the computer 100 or be received from an external computer source via some data communication system.

It should be noted that a corresponding control unit 80 may also be utilized for controlling power to and from the rotating electrical machine 4 according to the second embodiment.

Figure 11:
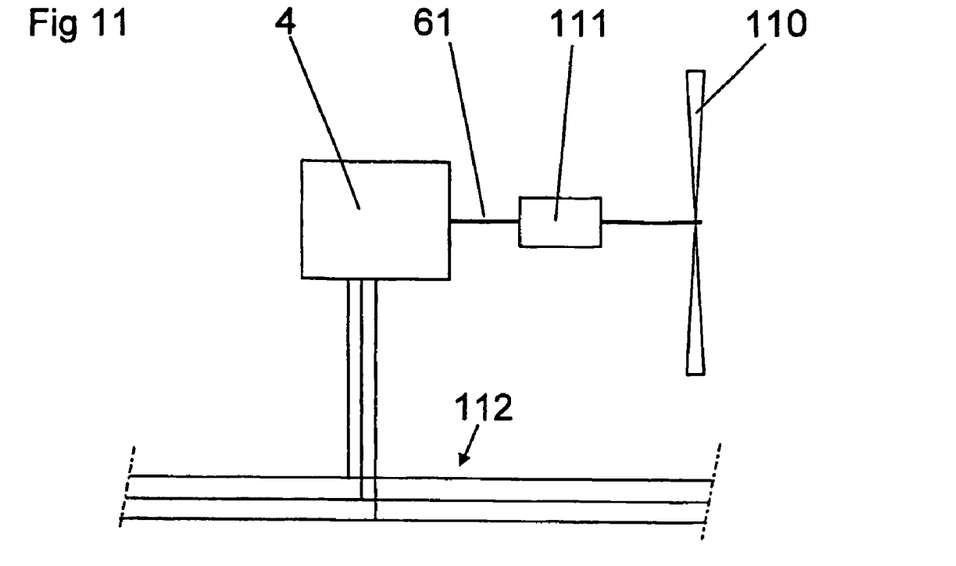
FIG. 11 schematically shows a wind-power application for generating alternating current with a rotating electrical machine according to the invention.

FIG. 11 schematically shows how the rotating electrical machine 4 in FIGS. 8-10 may be utilized in an application for generating alternating current in a wind power plant. The electrical machine 4 is connected, via the shaft 61, to a wind power propeller 110. A gearbox 111 may possibly be arranged between the propeller 110 and the electrical machine 4 for adjusting the speed. The electrical machine 4 may be connected into an electric ac network 112.

Figure 12:
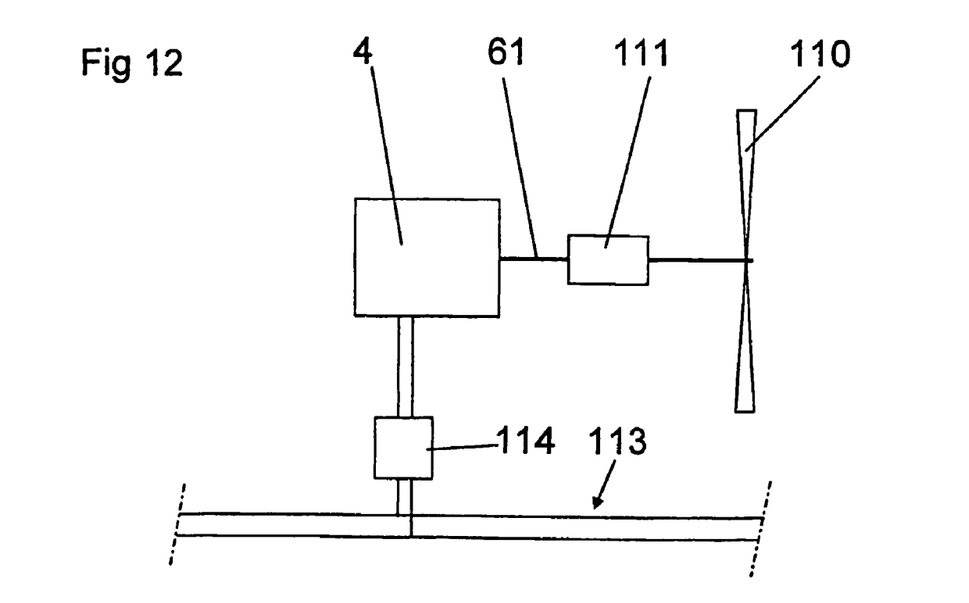
FIG. 12 schematically shows a wind-power application for generating direct current with a rotating electrical machine according to the invention.

FIG. 12 schematically shows, in a manner similar to that in FIG. 11, how the electrical machine 4 in FIGS. 8-10 may be utilized in an application for generating direct current in a wind power plant. Here, the electrical machine 4 may be connected to an electric dc network 113, possibly via suitable rectifier equipment 114.

The invention is not limited to the embodiments shown but may be modified and varied within the scope of the following claims.

The invention claimed is:

1. An electrical machine of the transversal-flux type, comprising
    a stator comprising a plurality of stator elements with magnetic flux conductors and an electric conductor forming a winding extending in an essentially closed winding path through each magnetic flux conductor, and
    a movable element which comprises a number of permanent-magnet members and which is movable in relation to the stator along a movement path,
    wherein the movable element is adapted to carry out a linear reciprocating motion,
    wherein the essentially closed winding path comprises a first current-carrying section extending essentially along the movement path,
    wherein each magnetic flux conductor is adapted to form, together with one of said permanent-magnet members, a closed magnetic flux circuit extending around said current-carrying section,
    wherein each permanent-magnet member comprises a primary magnet that has a north pole and a south pole and a magnetic direction extending from the south pole to the north pole and essentially across the movement path, and
    wherein the permanent-magnet members are arranged in an alternating order in the movable element with respect to the magnetic direction of the primary magnet,
    characterized in that adjacent permanent-magnet members of the movable element are separated from each other by an intermediate member comprising at least one secondary magnet which has a north pole and a south pole and a magnetic direction extending from the south pole to the north pole and essentially across the magnetic direction of the primary magnet, wherein magnetic fields of adjacent permanent-magnet members and their secondary magnets are operable to mutually repel for essentially avoiding flux fringing in respect of the stator.

2. An electrical machine according to claim 1, characterized in that the magnetic direction of the secondary magnet extends essentially parallel to the movement path.

3. An electrical machine according to claim 2, characterized in that each intermediate member of the movable element comprises two secondary magnets.

4. An electrical machine according to claim 3, characterized in that secondary magnets of an intermediate member between first and second adjacent permanent-magnet members are arranged in such a way that the first secondary magnet is in the vicinity of the north pole of the primary magnet of the first permanent-magnet member and the south pole of the primary magnet of the second permanent-magnet member and so that the second secondary magnet is in the vicinity of the south pole of the primary magnet of the first permanent-magnet member and the north pole of the primary magnet of the second permanent-magnet member.

5. An electrical machine according to claim 3, characterized in that each intermediate member of the movable element comprises a layer of a magnetically insulating material outside the two secondary magnets.

6. An electrical machine according to claim 3, characterized in that each permanent-magnet member comprises a first magnetic flux conductor on one side of the primary magnet and a second magnetic flux conductor on the other side of the primary magnet.

7. An electrical machine according to claim 3, characterized in that the secondary magnets of an intermediate member between two adjacent permanent-magnet members are arranged in such a way that the first secondary magnet extends between a first magnetic flux conductor of the two permanent-magnet members and so that the second secondary magnet extends between a second magnetic flux conductor of the two permanent-magnet members.

8. An electrical machine according to claim 1, characterized in that the magnetic direction of said secondary magnet is essentially perpendicular in relation to the magnetic direction of the primary magnets.

9. An electrical machine according to claim 1, characterized in that each magnetic flux circuit comprises a magnetic flux that is parallel to a plane which is essentially perpendicular to the movement path.

10. An electrical machine according to claim 1, characterized in that the distance between a centre of adjacent permanent-magnet members is essentially equal to the distance between a centre of adjacent magnetic flux conductors of the stator.

11. An electrical machine according to claim 1, characterized in that the magnetic flux conductors of the stator are arranged in an alternating order with respect to the direction of the magnetic flux in relation to the permanent-magnet members in the respective magnetic flux circuit.

12. An electrical machine according to claim 1, characterized in that the essentially closed winding path comprises a second current-carrying section extending essentially parallel to the movement path.

13. An electrical machine according claim 12, characterized in that the first current-carrying section of the winding path is associated with essentially a first half of the magnetic flux conductors of the stator and the second current-carrying section of the winding path is associated with essentially a second half of the magnetic flux conductors of the stator.

14. An electrical machine according claim 13, characterized in that the permanent-magnet members of the movable element are adapted to cooperate with those magnetic flux conductors of the stator which are associated with the first current-carrying section, and those magnetic flux conductors of the stator which are associated with the second current-carrying section.

15. An electrical machine according to claim 1, characterized in that each magnetic flux conductor comprises at least one magnetic flux-conducting section, wherein said sections of each magnetic flux conductor are arranged in a line one after the other which is parallel to the movement path, wherein the magnetic flux of said section of each magnetic flux conductor extends in essentially the same direction and wherein a dividing member is arranged between each pair of adjacent magnetic flux conductors and comprises main sections which comprise a magnetically conducting material and which extend along said section.

16. An electrical machine according to claim 15, characterized in that said sections form a magnetic flux-conducting central section.

17. An electrical machine according to claim 16, characterized in that each a magnetic flux conductor comprises at least said central section and two magnetic flux-conducting end sections.

18. An electrical machine according to claim 17, characterized in that each dividing member is magnetically insulating along the end sections.

19. An electrical machine according to claim 18, characterized in that each dividing member forms a space with air along the end sections.

20. An electrical machine according to claim 1, characterized in that the main section of said dividing member is made of a magnetically conducting iron.

21. An electrical machine according to claim 1, characterized in that the two end sections of each magnetic flux conductor are displaced in a plane essentially perpendicular to the movement path in relation to the end sections of each adjacent magnetic flux conductor.

22. An electrical machine according to claim 1, characterized in that the movable element is connected to at least one piston that is movably arranged in a housing.

23. An electrical machine according to claim 22, characterized in that the electrical machine is adapted to cooperate with a combustion engine, whereby said housing forms a combustion chamber in which the piston is movable back and forth.

24. Use of the electrical machine according to claim 1 as a generator for generating electric power.

25. Use of the electrical machine according to claim 1 as a generator for generating electric power, said generator being adapted to constitute a component in one of a wind power plant and a wave power plant.

26. Use of the electrical machine according to claim 1 as a motor for generating mechanical power.

27. Use according to claim 26, wherein said motor is adapted to form a drive motor in a vehicle.

* * * * *